(12) United States Patent
Tang

(10) Patent No.: US 9,648,934 B2
(45) Date of Patent: May 16, 2017

(54) CAMERA BAG

(71) Applicant: Ming Kai Tang, Hong Kong (HK)

(72) Inventor: Ming Kai Tang, Hong Kong (HK)

( * ) Notice: Subject to any disclaimer, the term of this patent is extended or adjusted under 35 U.S.C. 154(b) by 148 days.

(21) Appl. No.: 14/705,987

(22) Filed: May 7, 2015

(65) Prior Publication Data
US 2015/0326761 A1     Nov. 12, 2015

(30) Foreign Application Priority Data

Sep. 4, 2014   (CN) .................... 2014 2 0508517 U

(51) Int. Cl.
| | |
|---|---|
| *H04N 5/225* | (2006.01) |
| *A45C 11/38* | (2006.01) |
| *G03B 17/56* | (2006.01) |
| *H04N 5/232* | (2006.01) |
| *A45F 5/00* | (2006.01) |

(52) U.S. Cl.
CPC ............... *A45C 11/38* (2013.01); *A45F 5/00* (2013.01); *G03B 17/561* (2013.01); *H04N 5/2252* (2013.01); *H04N 5/2254* (2013.01); *H04N 5/23293* (2013.01); *A45F 2200/0533* (2013.01); *G03B 17/568* (2013.01)

(58) Field of Classification Search
CPC ............... H04N 5/2254; H04N 5/2252; H04N 5/23293; G03B 17/568; G03B 17/561; A45C 11/38; A45F 5/00; A45F 2200/0533

See application file for complete search history.

(56) References Cited

U.S. PATENT DOCUMENTS

| | | | | |
|---|---|---|---|---|
| 4,923,060 A  * | 5/1990 | Breslau ................. | A45C 11/38 |
| | | | 190/102 |
| 4,982,841 A  * | 1/1991 | Goedecke ............. | A45C 11/38 |
| | | | 206/316.2 |
| 5,101,974 A  * | 4/1992 | Alwitt .................... | A45C 11/38 |
| | | | 206/316.2 |
| 7,060,921 B2 * | 6/2006 | Kubo ..................... | G03B 17/08 |
| | | | 200/293 |
| 7,426,339 B2 * | 9/2008 | Takanashi ............. | G03B 17/08 |
| | | | 206/316.2 |
| 8,781,312 B1 * | 7/2014 | deSouza, Jr. ......... | G03B 17/08 |
| | | | 396/27 |
| 2004/0251151 A1* | 12/2004 | Doran, Jr. ............. | A45C 11/38 |
| | | | 206/316.1 |
| 2005/0115852 A1* | 6/2005 | Funahashi ............. | G03B 17/08 |
| | | | 206/316.2 |
| 2007/0051646 A1* | 3/2007 | Imoto .................... | B60R 11/04 |
| | | | 206/316.2 |

(Continued)

*Primary Examiner* — Lin Ye
*Assistant Examiner* — John H Morehead, III

(57) ABSTRACT

The present invention relates to a camera bag comprising a supporting frame for fixing a camera, and a shell for accommodating the camera and the supporting frame. The supporting frame comprises a front panel having a lens aperture and a supporting plate for fixing the camera. The front panel is detachably connected to the supporting plate through a connector. The camera bag further comprises a fixing means for fixing front of the camera lens on the front panel of the supporting frame. The present invention allows a user to shoot at any time without taking the camera out of the bag, and it can prevent the camera from the damage of rain, snow, and sand wind.

8 Claims, 20 Drawing Sheets

(56) References Cited

U.S. PATENT DOCUMENTS

| | | | |
|---|---|---|---|
| 2011/0024314 A1* | 2/2011 | Merrill | A45C 11/38 206/316.2 |
| 2013/0213856 A1* | 8/2013 | Ho | A45C 11/00 206/775 |
| 2013/0240589 A1* | 9/2013 | Bevis | A45F 3/02 224/600 |
| 2015/0177532 A1* | 6/2015 | Evans | A45C 11/38 356/402 |

* cited by examiner

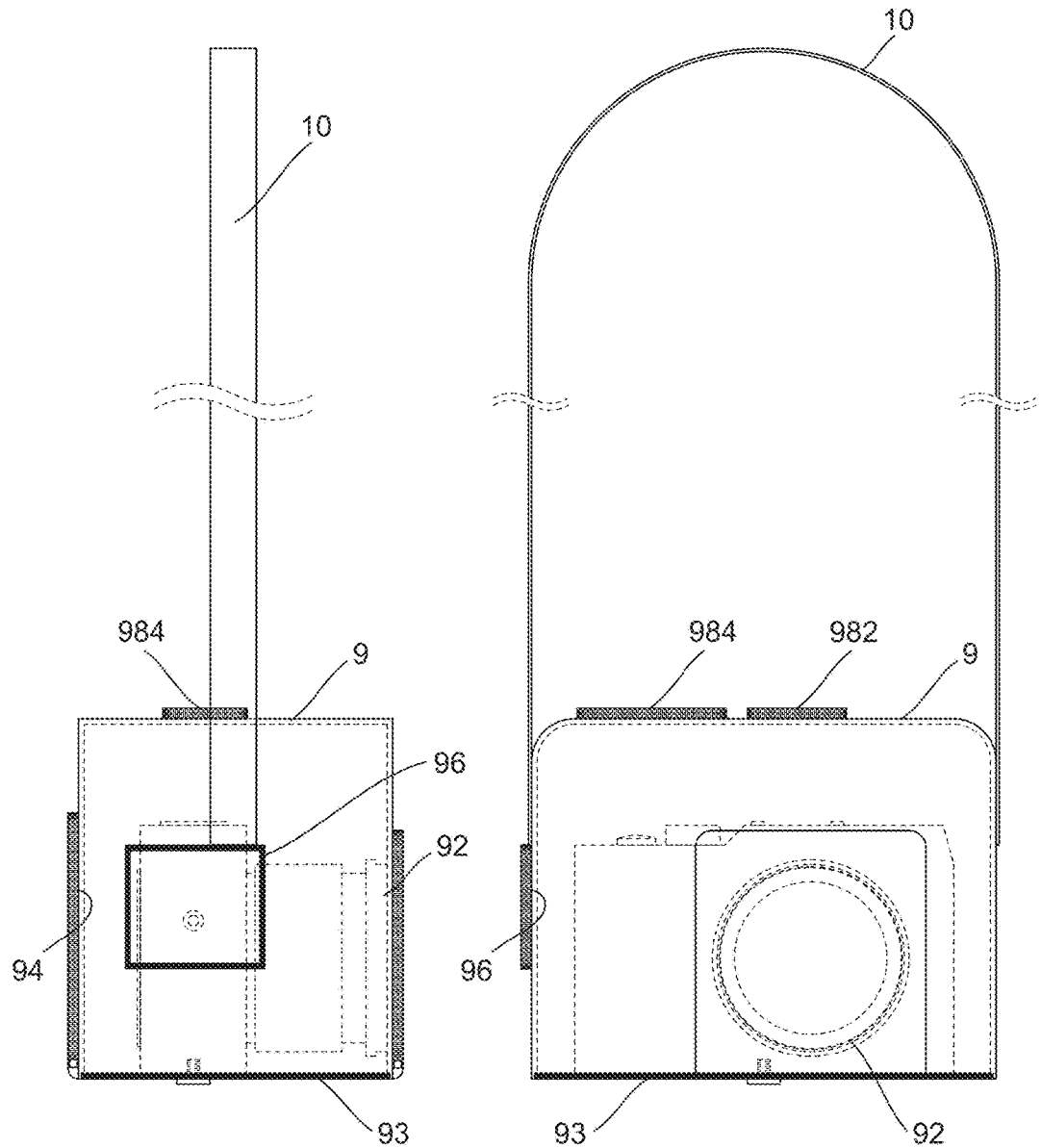

CAMERA BAG

CROSS REFERENCE TO RELATED APPLICATIONS

This application claims priority of Chinese patent application No. 201420508517.7 filed on Sep. 4, 2014, the contents of which all hereby incorporated by reference.

TECHNICAL FIELD

The present invention relates to a bag, specifically, relates to a camera bag, more specifically, relates to a bag which is used for placing a camera and combining with the camera.

DESCRIPTION OF THE RELATED ART

Currently, the ordinary camera bag on the market mainly used for placing a camera. When we need to use the camera to shoot, we need to take out it from the camera bag first, so often miss the wonderful moment. And after taking the camera out of the bag, it won't get the protection of the camera bag during the shooting.

SUMMARY OF THE INVENTION

The purpose of the present invention is to provide a new type of camera bag, which allows users to shoot at any time without taking the camera out of the bag, at the same time, can protect the camera during shooting, and prevent the camera from the damage of rain, snow, and sand wind. On the other hand, this camera bag can lower the shutter sound during shooting, which will prevent the shooting subject from disturbing. Therefore it's particularly suitable for the places which need quiet to shoot, such as: concerts, museums, conference rooms and other places. This camera bag is very suitable for travel use, because it can hide the camera in the bag to shoot. And it allows users to operate with only one hand. Therefore it will prevent the camera from being robbed, and improve the security and convenience of the shooting.

Therefore, in an embodiment, the present invention comprises a supporting frame for fixing a camera, and a shell for accommodating the camera and the supporting frame. The supporting frame comprises: a front panel having a lens aperture and a supporting plate used for fixing the camera. The front panel is detachably connected to the supporting plate through a connector, and the front panel can rotate relative to the supporting plate. The camera bag further comprises a fixing means for fixing front of the camera lens on the front panel of the supporting frame. A first window with a cover piece is provided on the front of the shell, which is corresponded with the lens aperture of the front panel of the supporting frame. A second window with a cover piece is provided on the back of the shell for watching a camera LCD screen. A third window with a cover piece is provided on the top of the shell for watching a vertical viewfinder of the camera and operating a button on top right corner of the camera.

At least one slot is provided on the supporting plate for fixing the camera, one end of the slot is arranged as an entrance which allows a fastening screw to insert in. As a preferred embodiment, there are two slots provided on the supporting plate for fixing the camera.

The fixing means for fixing the front of the camera lens comprises a first component, a second component and a third component each of which is shaped as a circular ring. Among them, the first component and the second component are mounted on outside and inside of the lens aperture of the front panel of the supporting frame to make the fixing means fixed on the supporting frame. One end of the third component is connected to the second component by ways of a snap connection, while other end is connected to the front of the camera lens by ways of a threaded connection.

As a preferred embodiment, outside of the first component is connected with a UV filter by ways of a threaded connection.

As a preferred embodiment, a fourth window with a cover piece is provided at a first position on the shell corresponding to a camera shutter release plug interface.

As a preferred embodiment, a fifth window with a cover piece is provided at a second position on the shell corresponding to other side of the camera shutter release plug interface and allowing a user to stick fingers into the fifth window for operating a zoom ring of the camera lens.

As a preferred embodiment, the front plate of the supporting frame is set as a retractable lens fixing frame which comprises a retractable frame constituted by a frame, a panel for fixing the camera lens and a connecting means. The connecting means connects the frame to the panel and made by a collapsible material.

As a preferred embodiment, a cavity is provided under the supporting plate of the supporting frame for placing photographic equipment part. A window with a cover piece is provided on the back of the camera bag corresponding to the cavity.

In another embodiment, a camera bag of the present invention comprises a shell for accommodating a camera, a fixing means for fixing front of a camera lens on the shell. A lens aperture with a cover piece is provided on front of the shell. At least one slot is provided on the bottom of the shell for fixing the camera. One end of the slot is arranged as an entrance which allows a fastening screw to insert in. A window with a cover piece is provided on back of the shell for watching a camera LCD screen. A window with a cover piece is provided on top of the shell for watching a vertical viewfinder of the camera and operating a button on top right corner of the camera.

BRIEF DESCRIPTION OF THE DRAWINGS

FIG. 25 is a side view of another embodiment of the present invention;

FIG. 26 is a front view of the camera bag as shown in FIG. 25; and

DETAILED DESCRIPTION OF PREFERRED EMBODIMENTS

In an implementation of the present invention, a camera bag comprises a supporting frame 2 used for fixing a camera and a shell 1.

Figure 1:
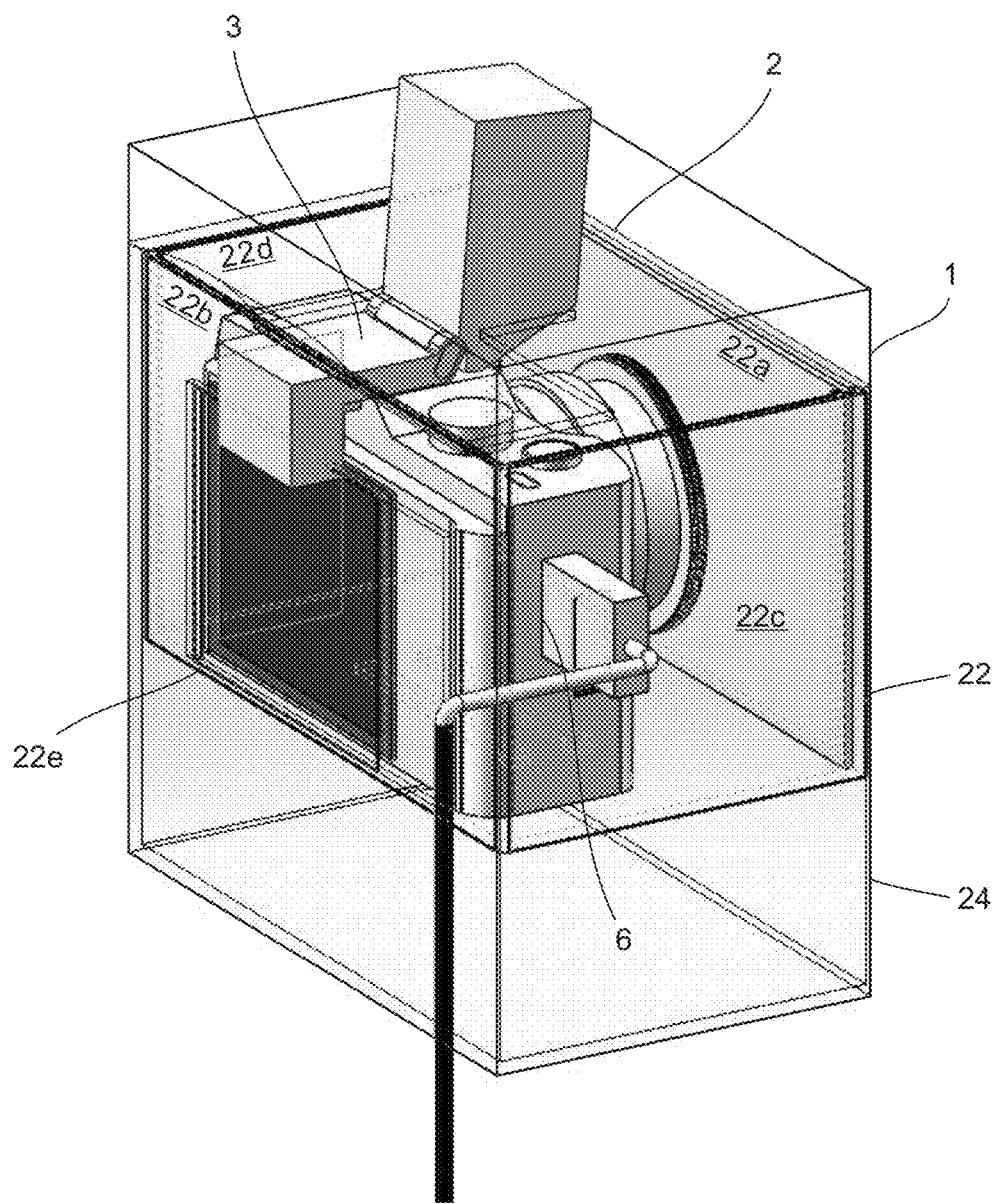
FIG. 1 is a schematic diagram of a supporting frame with a camera in an embodiment of the present invention.
Figure 2:
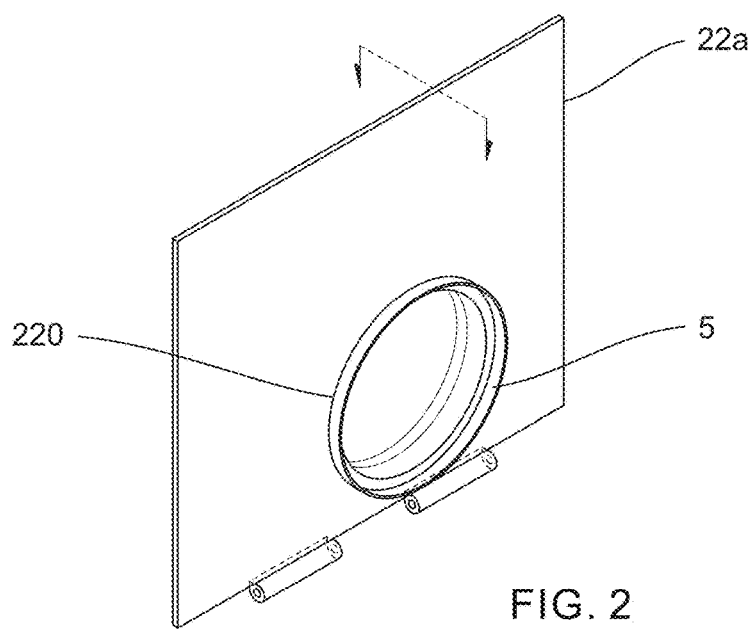
FIG. 2 is a front perspective view of a camera lens fixing means on the front of the supporting frame as shown in FIG. 1.
Figure 3:
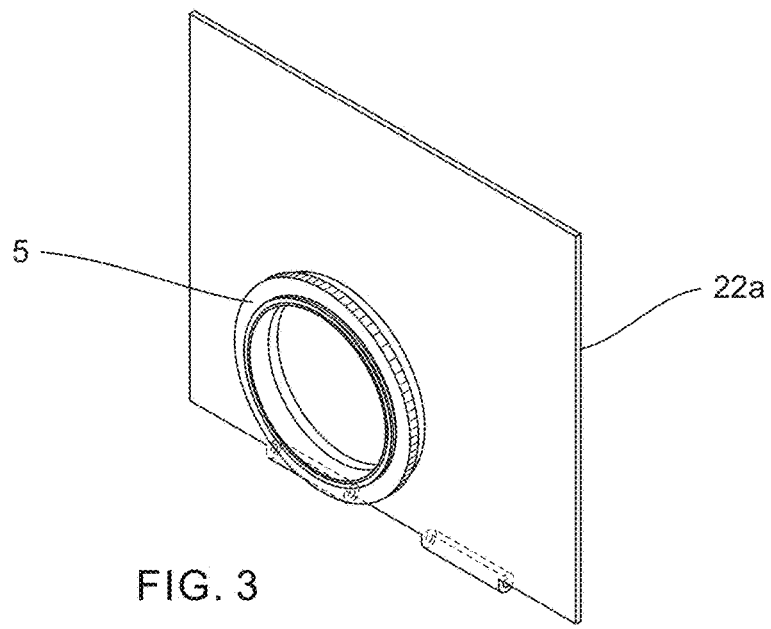
FIG. 3 is a rear perspective view of a camera lens fixing means on the front of the supporting frame as shown in FIG. 1.
Figure 4:
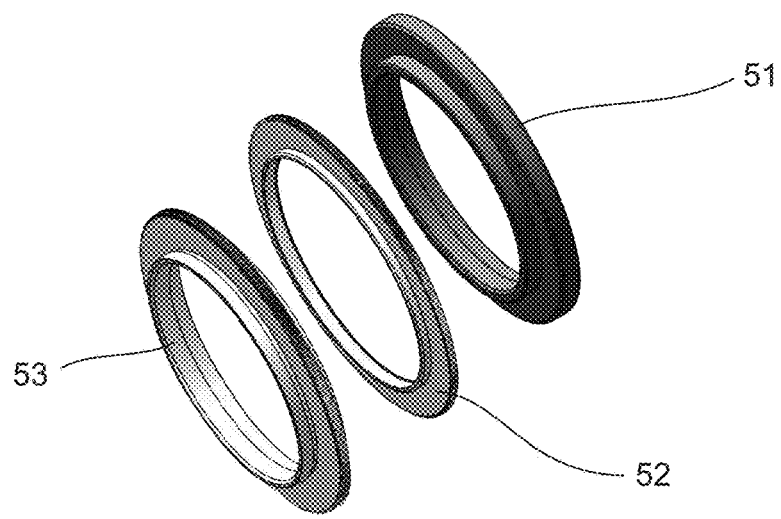
FIG. 4 is an exploded diagram of the camera lens fixing means.
Figure 5:
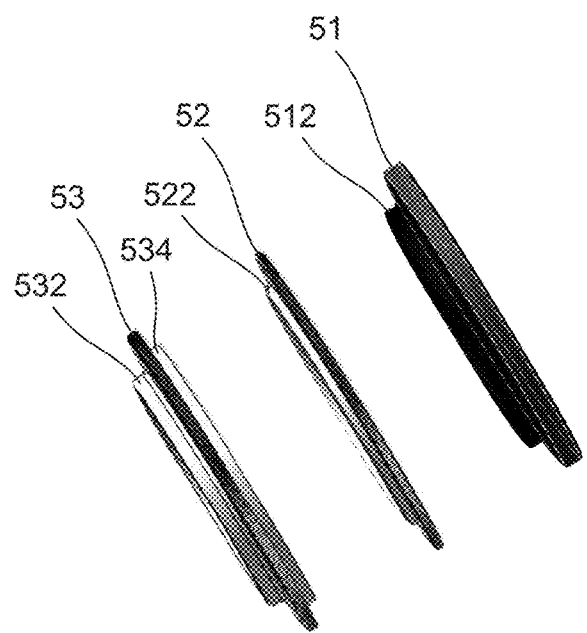
FIG. 5 is an exploded diagram of the camera lens fixing means from another point of view as shown in FIG. 4.
Figure 6:
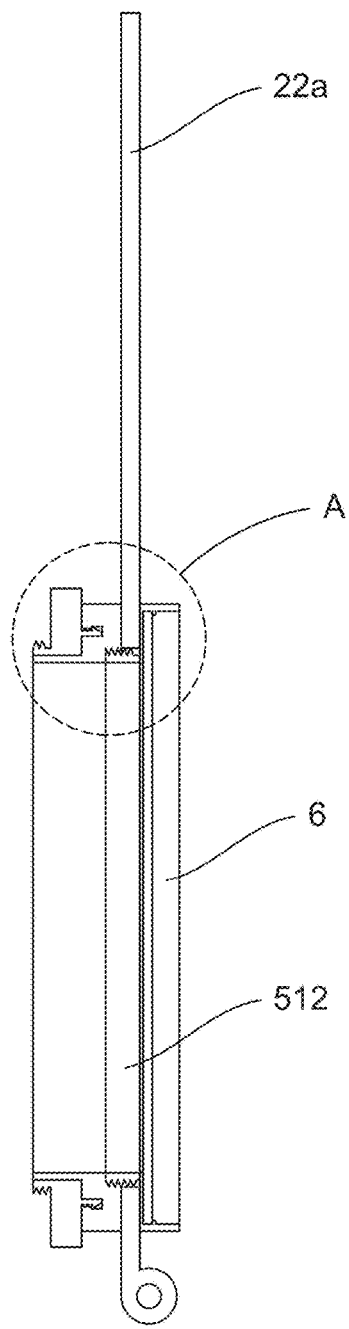
FIG. 6 is a cross-section view of the camera lens fixing means which is mounted on the front wall as shown in FIG. 4.
Figure 7:
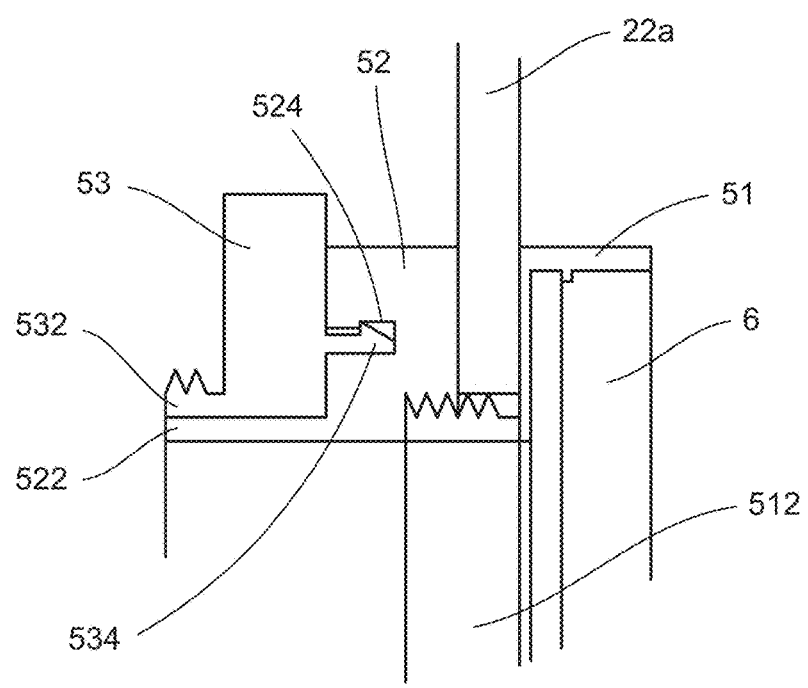
FIG. 7 is an enlarged view of the part A as shown in FIG. 6.

FIG. 1 shows a schematic structure of the supporting frame 2 which installed a camera 3. The supporting frame 2 is a frame structure constituted by an upper portion and a lower portion. The upper portion 22 has a front wall 22a, a rear wall 22b, a first side wall 22c, a second side wall 22d which is opposing the first side wall 22c, and a bottom wall 22e.

With reference to FIGS. 2 to 5, the front wall 22a of the upper portion of the supporting frame 2 is constituted by a front panel having a lens aperture 220, a fixing means 5 is installed on the lens aperture 220. The fixing means 5 is used for fixing a lens of the camera 3, which comprises a first component 51, a second component 52 and a third component 53, each of these components is shaped as a circular ring.

One end of the first component 51 is provided around its annular end edge with a flange which is outwardly perpendicular to the radial direction. Inner surface of the flange is provided with a female thread (not shown). A UV filter 6 having a rim is engaged with the female thread on the inner surface of the flange of the first component 51, through a male thread provided on outer surface of the rim of the UV filter 6, so as to fix the UV filter 6 on the first component 51. The other end of the component 51 is provided with a convex neck 512 along edge of its center hole, the convex neck 512 is outwardly projecting and perpendicular to the radial direction. Outer surface of the convex neck 512 is provided with a male thread (not shown), the outer diameter of the convex neck 512 is slightly smaller than the diameter of the lens aperture 220, such that the convex neck can be freely pass through the lens aperture 220.

Inner surface of one end of the second component 52 is provided with a female thread (not shown) which is engaged with the male thread on the convex neck 512 of the first component 51, so as to make the convex neck 512 of the first component 51, which passed through the lens aperture 220, fastened together with the second component 52 by the threads, while the front panel is clamped therebetween. Further, the other end of the component 52 is provided with a convex neck 522 along edge of its center hole, the convex neck 522 is outwardly projecting and perpendicular to the radial direction. Outer surface of the convex neck 522 is smooth surface. An annular slot 524 is provided in the circumferential direction of end wall of one end of the convex neck 522.

One end of the component 53 is provided with a rim 532 along edge of its center hole, the rim 532 is outwardly projecting and perpendicular to the radial direction. Inner diameter of the rim is slightly larger than outer diameter of the convex neck 522 of the second component 52. Outer surface of the convex neck 532 is provided with a male thread for engagement with a female thread provided on front of the camera lens, so that the camera lens is mounted on the front panel of the supporting frame. Inner surface of the third component 53 is smooth. A circular flange 534 is provided on the other end of the third component 53, which is engaged with the annular slot 524 of the second component 52. The front end (that is, the free end) of the circular flange 534 is provided with a protruding having a hook-shape in cross-section, the hook-shaped protruding is combined with the annular slot to form a buckle structure, wherein the hook-shaped protruding and the annular slop connected to a 90 degree angle. Such a buckle structure makes the second and third component cannot be removable after the engagement, but it allows relatively free rotation between them.

Figure 8:
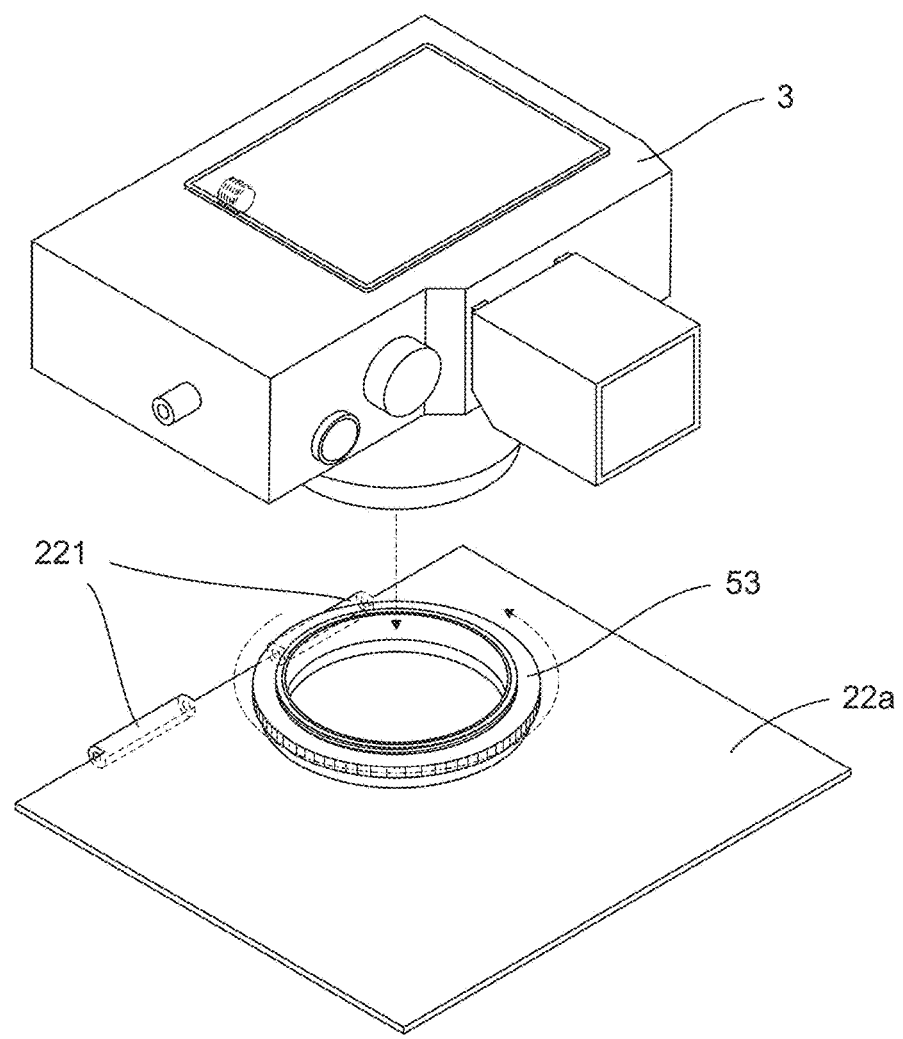
FIG. 8 is a schematic diagram of installing the camera lens on the front wall of the fixing means.

After the engagement of the second component 52 and the third component 53, the smooth outer surface of the convex neck 522 of the second component closes to the smooth inner surface of the rim 532 of the third component, and the corresponding surfaces of the second component and the third component contact with each other. Due to the above buckle structure, the third component 53 rotates with camera lens and can rotate freely relative to the second component 52, as shown in FIG. 8.

Because of the structure of the fixing means 5, the front end of the camera lens can be firmly fixed on the front panel of the supporting frame. A user can freely install a UV filter on this lens fixing means or remove it off without affecting the lens fixing means closely integrated with the front panel, and it is very convenient for daily use.

Alternatively, the threaded connection between the first component 51 and the second component 52 can be replaced by a rivet fixing manner. For example 4-5 rivets are sequentially passed through holes (not shown) on the plane of the first component, through-hole 220 on the front panel of the supporting frame, and holes (not shown) on the plane of the second component, and then fixed, whereby the first component and the second component are fixed together while the front panel of the supporting frame is clamped tightly therebetween. Such a fastening manner can prevent the components from loosening due to loosening of the threaded connection.

Seen from FIGS. 8 to 12, the front panel of the upper portion of the supporting frame is a movable plate. The bottom wall 22e of the supporting frame is constituted by a supporting plate. The front panel is connected to the supporting plate by ways of a detachable connection which allows the front panel rotates relative to the supporting plate. Such a detachable connection can be realized with a common bolt structure. For example (but not limited to) a bolt structure comprising at least one bolt hole provided on the front panel and the supporting frame respectively, a bolt and a bolt fastener. In this embodiment, on the bottom side of the front panel 22a is equipped with two aligned and spaced bolt holes 221; the front side of the supporting plate 22e is equipped with three aligned and spaced bolt holes 222. The bolt holes 222 on the supporting plate and the bolt holes 221 on the front panel are arranged staggered and adjacent to each other, so that all the bolt holes are arranged to a line and form a channel which allows a bolt 223 to insert and pass through, when the front panel and supporting plate are connected together. One end of the bolt 223 is a limit end, the other end, which is inserted through all the bolt holes and exposed outside, is fastened by a fixing member 224.

Of course, any other suitable detachable connection structures can also be used.

The supporting plate 22e on the upper portion 22 of the supporting frame 2 is used for supporting the camera. There is at least one slot 225 is provided on the supporting plate 223. One end of the bar slot is arranged as an entrance 225a which allows the fastening screw to insert.

Alternatively, two or more parallel slots can be provided on the supporting plate, the purpose is that: when the camera with different length of lens, the camera can be fastened on one proper slot by a fastening screw, so that the user can make the front end of the lens with different length be accurately fixed on the front wall of the supporting frame of the camera bag.

Figure 9:
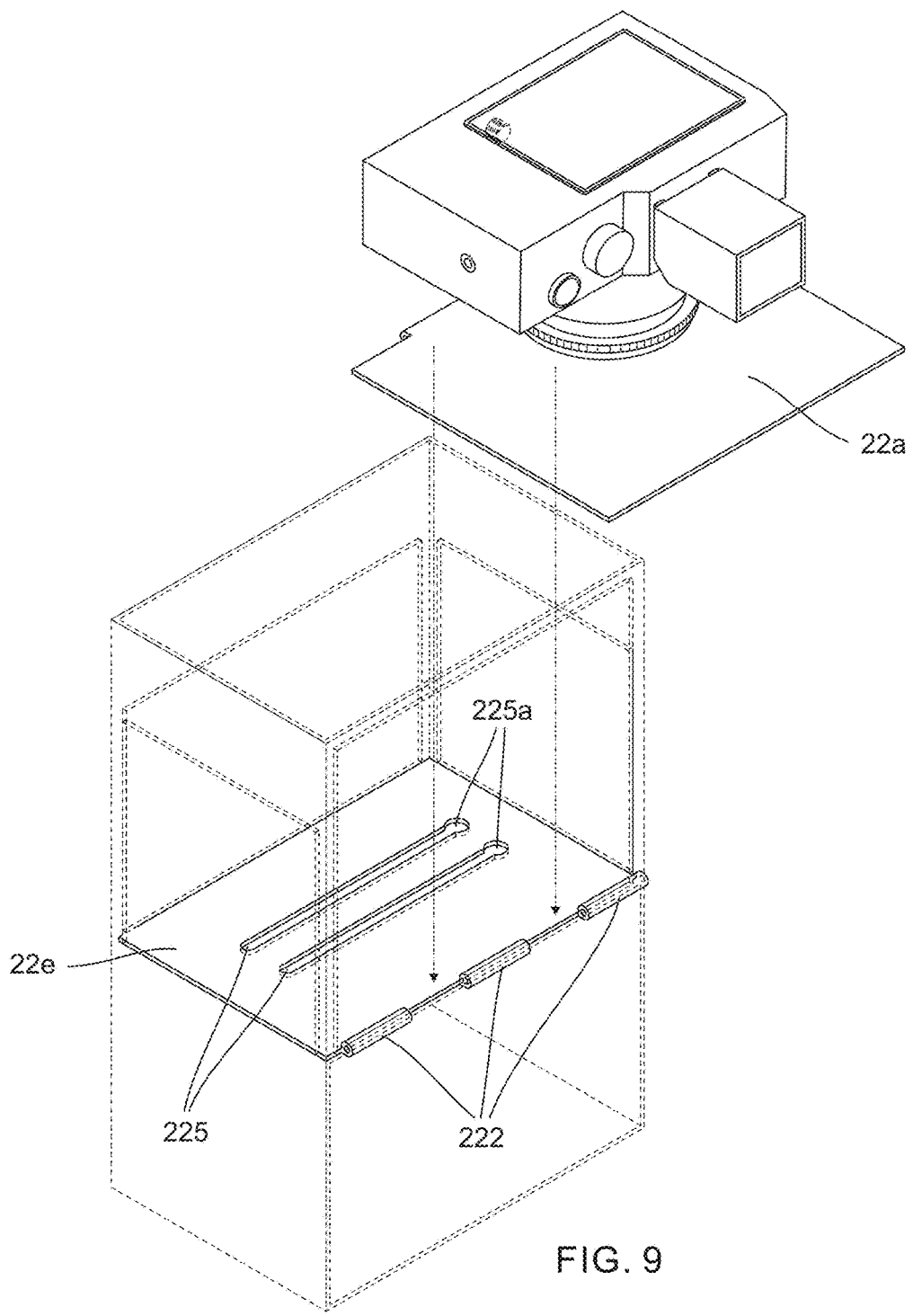
FIG. 9 is a schematic diagram of the camera which is fixed on the front wall is going to be mounted on the bottom wall of the supporting frame.
Figure 10:
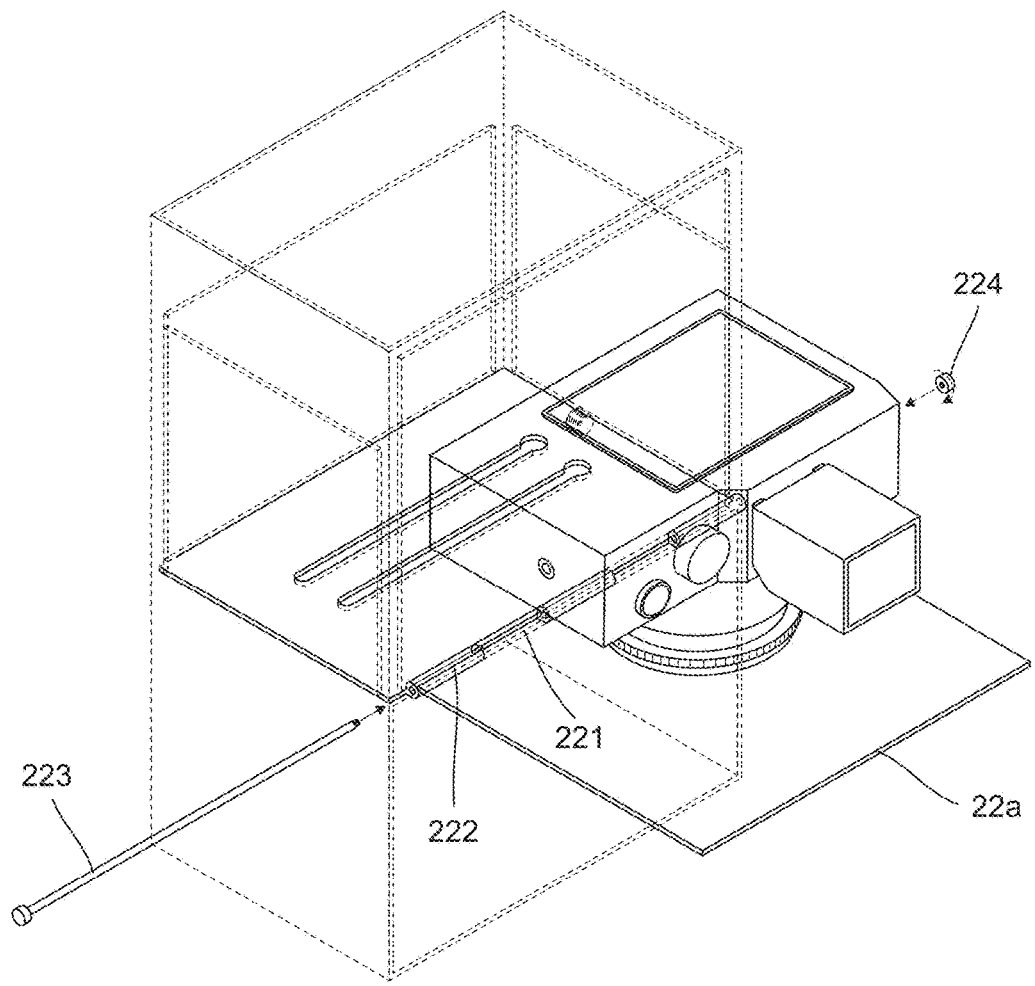
FIG. 10 is a schematic diagram of the front wall which is fixed with the camera connects with the supporting frame.
Figure 11:
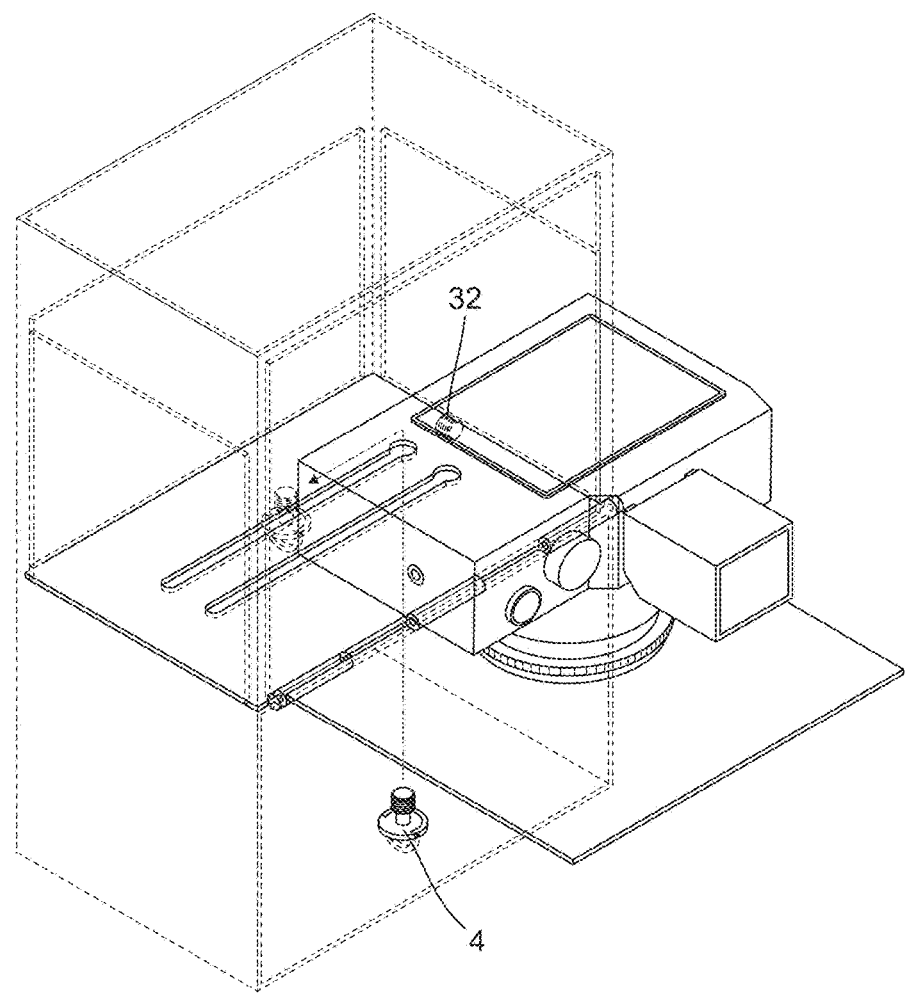
FIG. 11 is a schematic diagram of the camera which is going to be fixed on the bottom wall of the supporting frame.

In this embodiment, there are two parallel slots 225 on the supporting plate as shown in FIG. 9.

Figure 12:
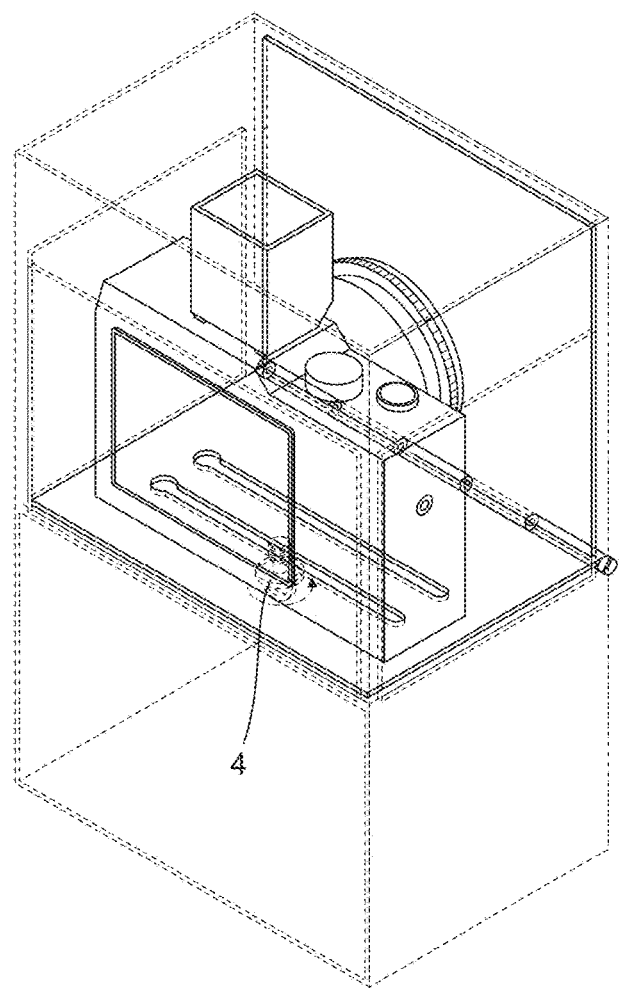
FIG. 12 is a schematic diagram of the camera which is fixing on the bottom of the supporting frame.

When installation, the lens of the camera 3 is firstly fixed on the front panel of the supporting frame 2 through the fixing means 5 (as shown in FIG. 8), then push the camera which is fixed on the front panel into the supporting frame 2 to make the camera located on the bottom wall of the supporting frame 2 (that is, supporting plate 22e), and one slot 225 on the supporting plate is arranged under the screw hole 32 of the bottom of the camera. Insert a fastening screw 4 from an entrance 225a of the slot and move it to below of the screw hole 32 of the bottom of the camera in the slot. Then make the screw 4 engaged with the screw hole 32 screw until tighten, as shown in FIG. 12, so as to fix the camera on the supporting plate. Meanwhile, the front panel 22a which is connected on the supporting plate 22e adjoins with two side walls 22a and 22d of the supporting frame.

With reference to the FIGS. 9 to 12, a window is provided on each side wall 22c, 22d and the rear wall 22d of the supporting frame, respectively. The window on the rear wall 22d is substantially corresponding to the location and size of the camera display. The window of one side wall (the right side wall 22c) is corresponding to the location of a plug interface 6 of the camera shutter release, and the size of the window is big enough to allow fingers of a user to stick into the window and operate the button on the top of the camera. The location and size of the other side wall (the left side wall 22d) allows the user to stick his fingers into the window and operate the zoom ring of the lens. Alternatively, left and right sides and the rear side of the supporting frame cannot be provided with walls or panels, that is, both sides and the rear side, respectively, can be an empty frame (not shown).

The bottom part 24 of the supporting frame comprises a cavity used to place camera accessories or clutter. The cavity can be provided with cubicles therein (not shown), the number, size and location of the cubicles can be set according to different needs.

The upper portion 22 of the supporting frame 2 is separated with the bottom part 24 by the bottom wall 22e (the supporting plate) of the upper portion.

Figure 13:
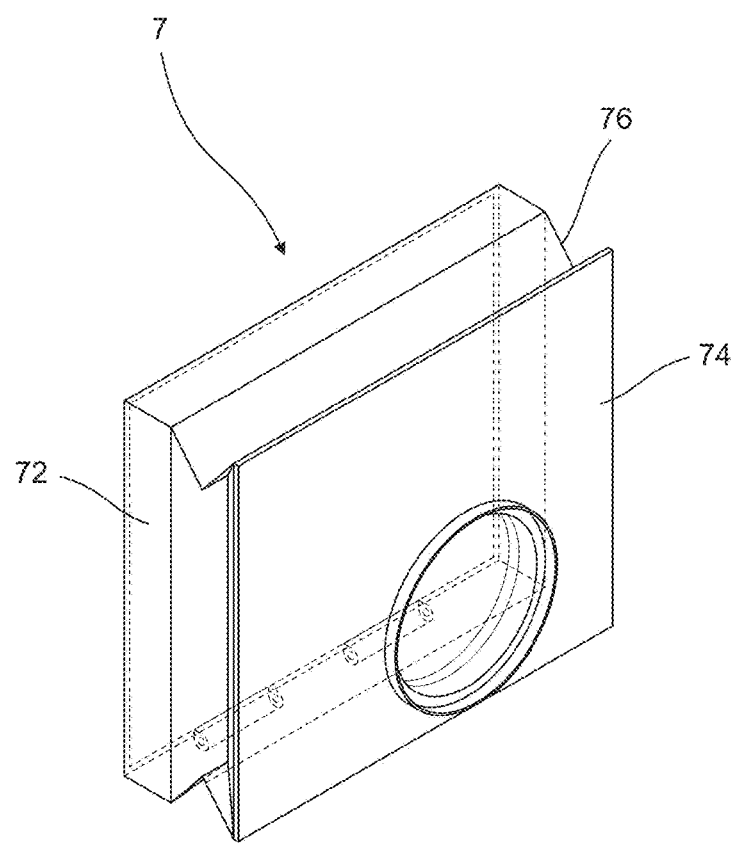
FIG. 13 is a schematic diagram of another retracted front wall which is equipped with a camera lens fixing means.
Figure 14:
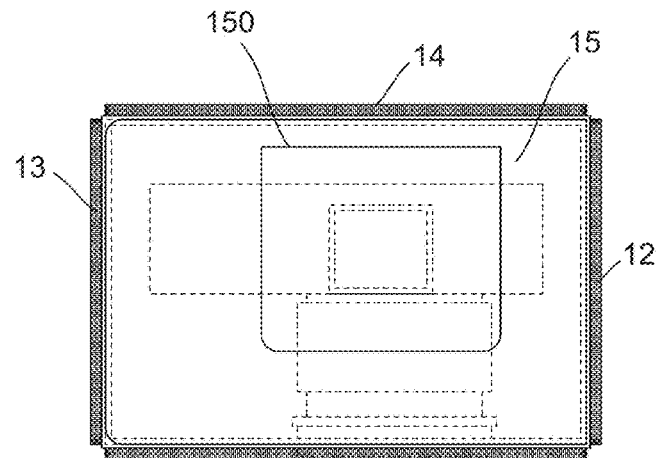
FIG. 14 to FIG. 17 show top view, side view, front view and rear view of the shell of the camera bag respectively, every opening on the shell is covered by a cover piece.

As an alternative, in order to make the camera bag be suitable for different length of camera lens and the zoom lens which will change the length of the lens, a retractable lens fixing frame can be used instead of the front panel of the supporting frame, as shown in FIG. 13. The retractable lens fixing frame as shown comprises a retractable frame 7, which is constituted by a frame 72, a panel 74 used for equipping the lens fixing means and a connecting member 76 for connecting the frame and the panel. The panel 74 is provided with a lens aperture which is used for equipping the fixing means of the camera lens. The structure of the lens fixing means and the structure of the lens aperture are same as the embodiment above. The connecting member 76 can be made from a flexible foldable material. That makes the panel 74 can extend from the location of the frame or retract back. The connecting member is designed to single folding shape or multi folding shape (such as an organ type, not shown), depending on need. The retractable frame 7 is detachably connected to the front of the supporting frame of the camera bag. The way of the connection and the structure are the same as the front panel 22a in the embodiment above, will not elaborate. This retractable lens fixing frame can be used for different length of lens, and also be used for a zoom lens, because the length of the zoom lens will be changed in use.

With reference to FIGS. 14 to 17, which sequentially show the top, side, front and rear views of the shell 1 of the camera bag.

In an embodiment as shown, the shell 1 of the camera bag is designed to be matched with the shape of the supporting frame 2, and tightly wrap the supporting frame. Wherein the shell 1, at the location of the front panel which is corresponding to the upper portion of the supporting frame, is provided with a front opening having a first cover piece 11. The size of the front opening is at least equal to or a slightly larger than the size of the active front wall of the supporting frame; the bottom of the first cover piece 11 is fixedly connected to the shell 1, an open having a second cover piece 110 is provided on the first cover piece 11 where corresponding to the location and size of the lens, the bottom of the second cover piece 110 is fixedly connected to the first cover piece 11. As the same, the shell 1 is provided with two openings, one having a third cover piece 12 and other having a forth cover piece 13, respectively corresponded to the window on the two side walls on the upper portion of the supporting frame, and an opening having a fifth cover piece 14 is provided on the shell 1, corresponded to the rear wall on the upper portion of the supporting frame. The bottom of the third, fourth and fifth cover piece are all fixedly connected the shell.

If there is no wall or panel provided on the both sides and the rear side of the supporting frame, it doesn't need to set opening(s) for the purpose above.

In addition, the top of the shell 1 of the camera bag is exposed end which can be closed by a sixth cover piece 15. One side of the sixth cover piece 15 is fixedly connected to the shell. The location on the sixth cover piece 15, corresponded to the vertical viewfinder of the camera, is provided with an opening having a seventh cover piece 150. One side of the seventh cover piece 150 is fixedly connected to the sixth cover piece 15. The location of the rear side of the shell 1, corresponded to the cavity of the bottom part 24 of the supporting frame, is provided with an opening having an eighth cover piece 16. One side or the bottom part of the eighth cover piece 16 is fixedly connected to the shell.

In the embodiments above, all the cover pieces use the zipper closure way to shut or close the relatively openings.

Of course, other closure ways can be used, such as, but not limited to, sticky buckle (snap button) and button, etc.

Figure 15:
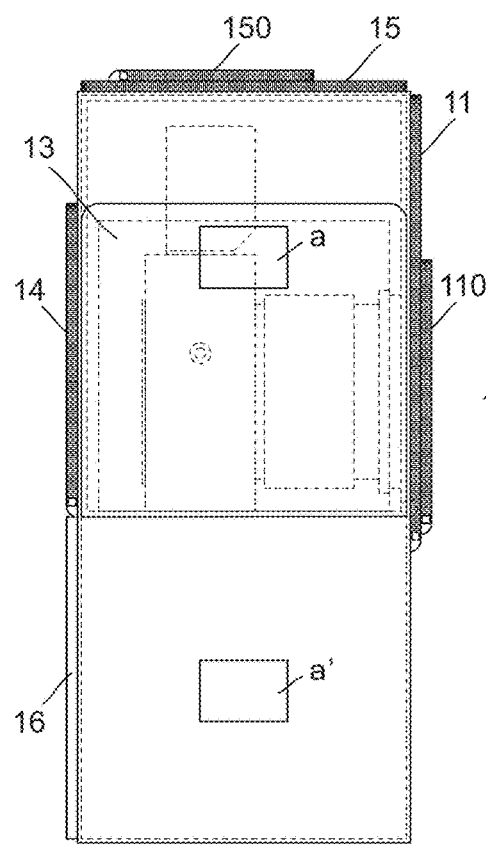
Figure 16:
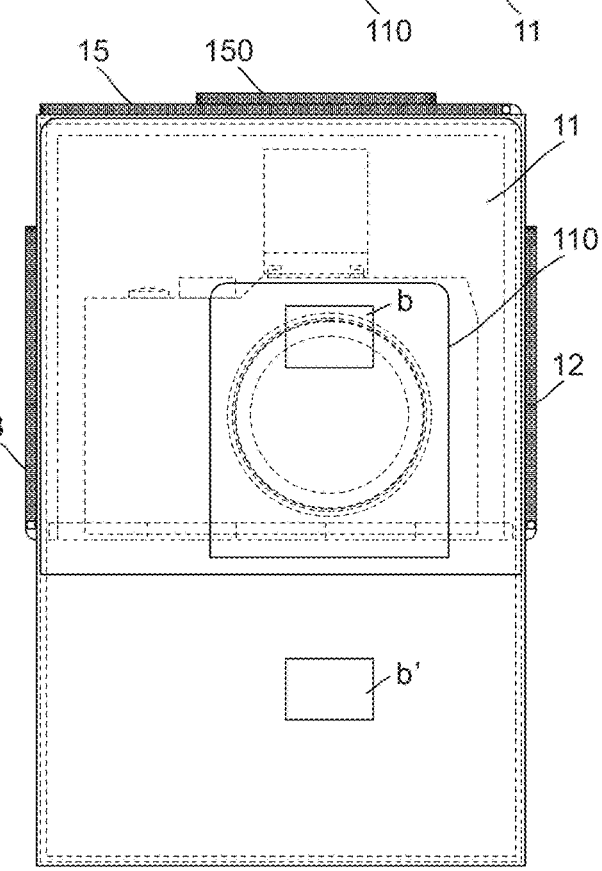
Figure 17:
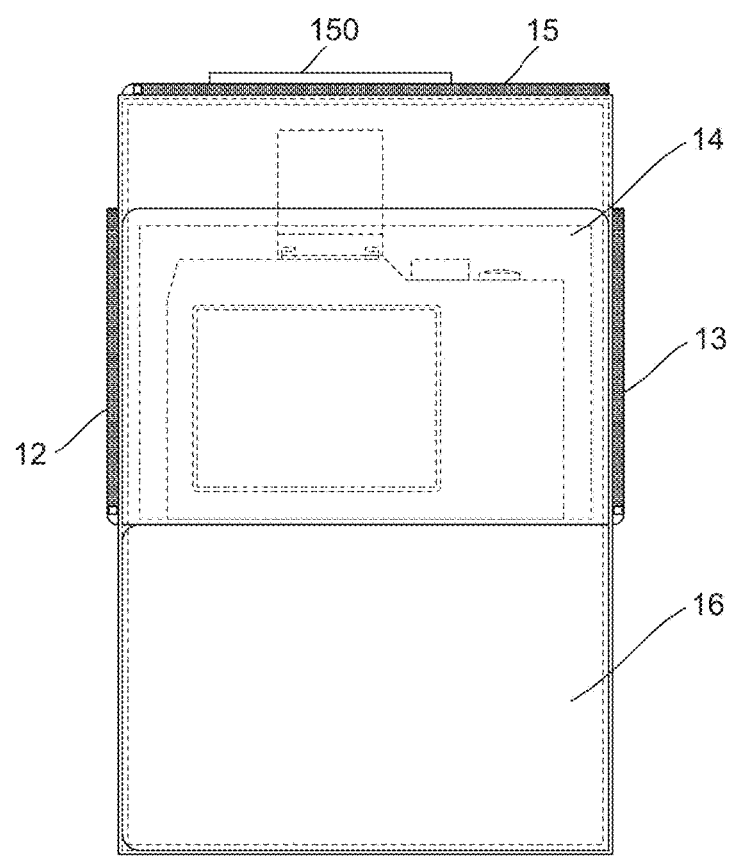
Figure 18:
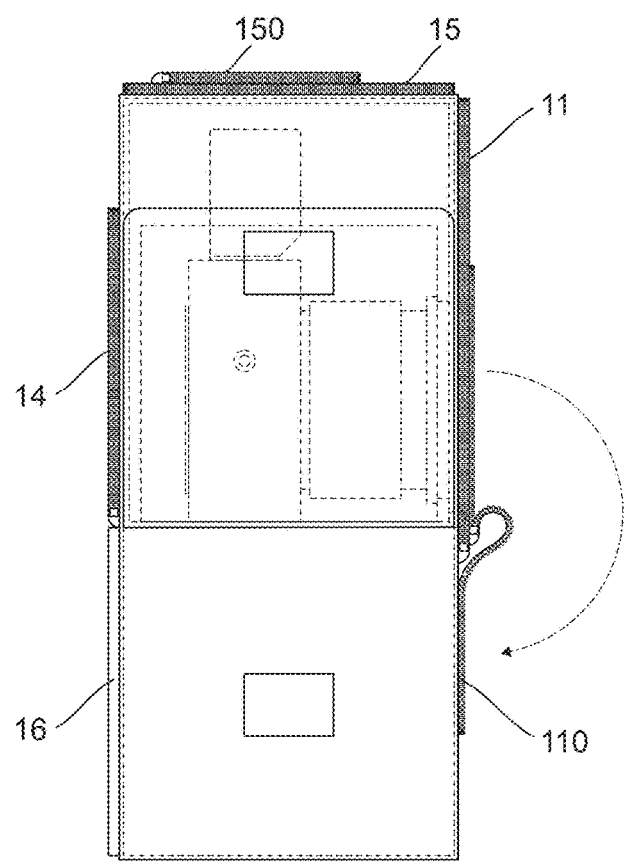
FIG. 18 to FIG. 20 show the open direction and the fastening state of the opening cover piece on the shell respectively.
Figure 19:
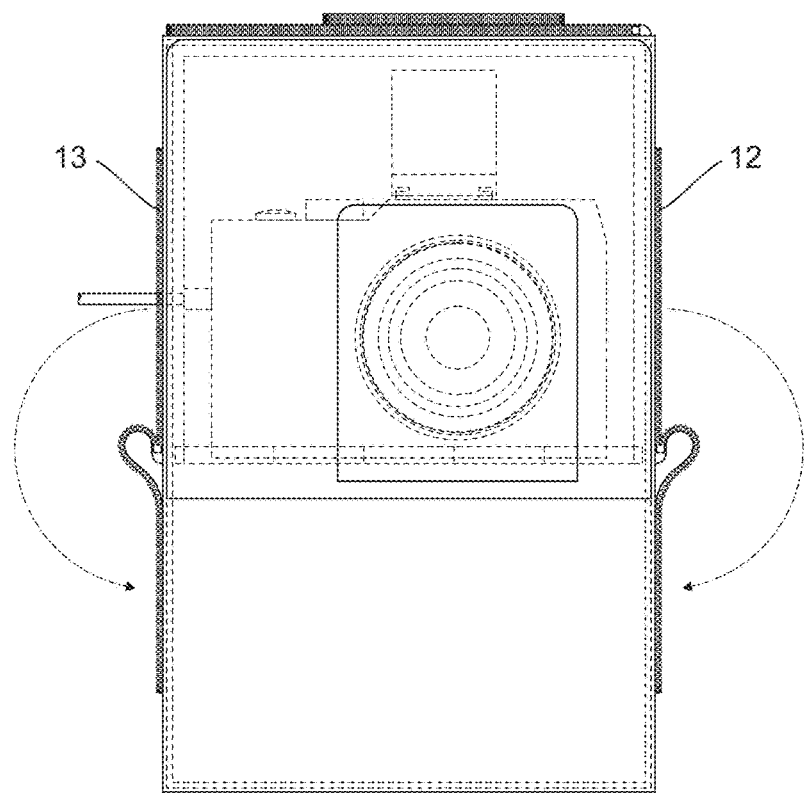
Figure 20:
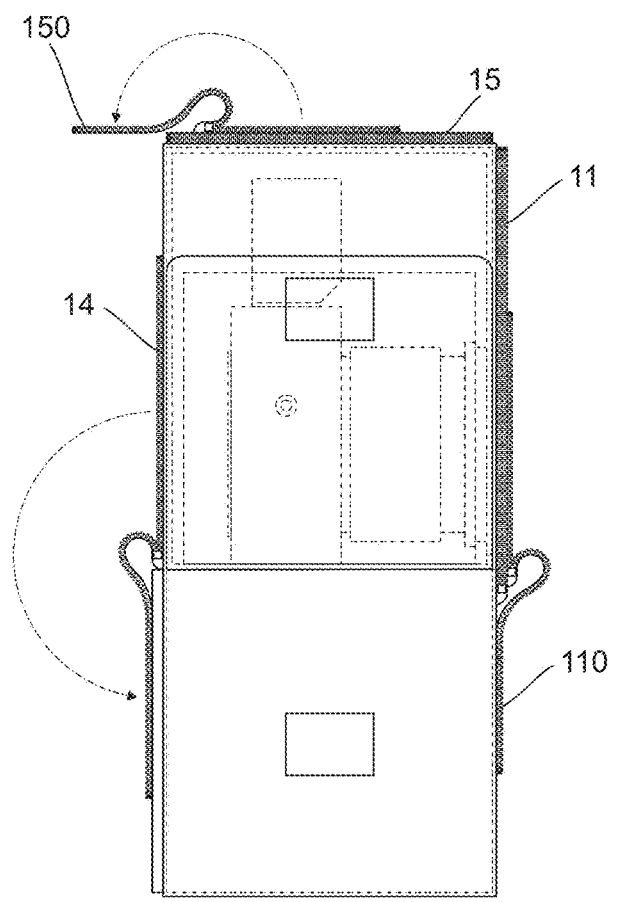
Figure 21:
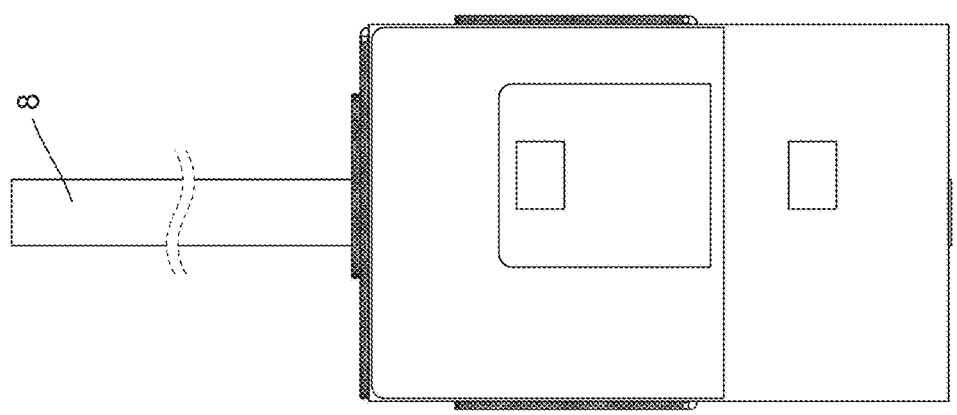
FIG. 21 to FIG. 22 are schematic diagrams of the camera bag with straps from different points of view.
Figure 22:
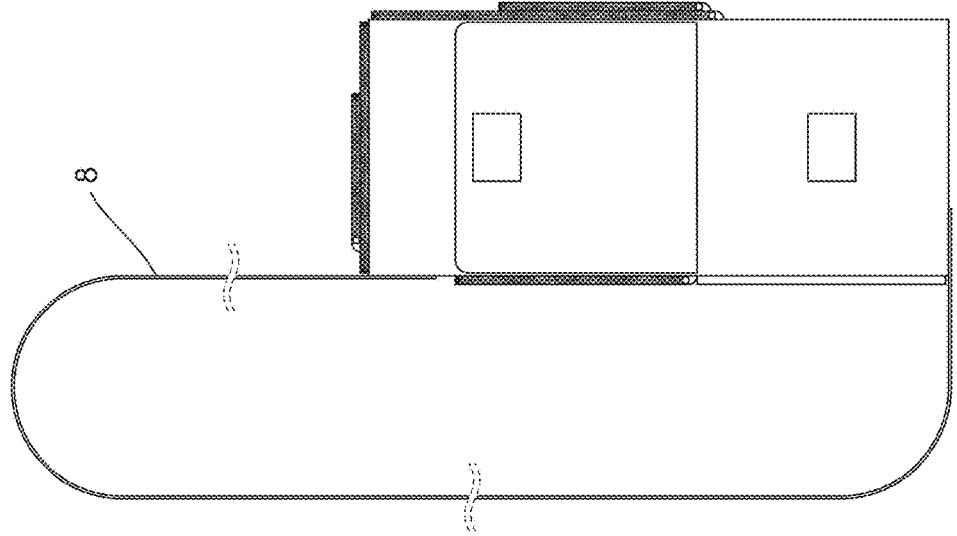
Figure 23:
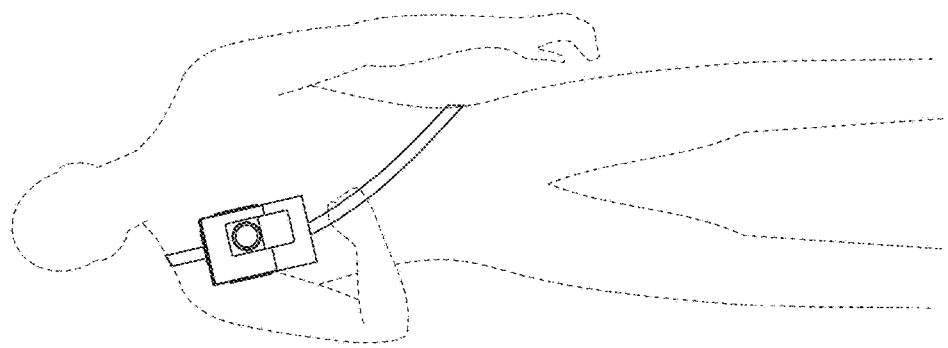
FIG. 23 to FIG. 24 are schematic diagrams of a user carrying the camera bag.
Figure 24:
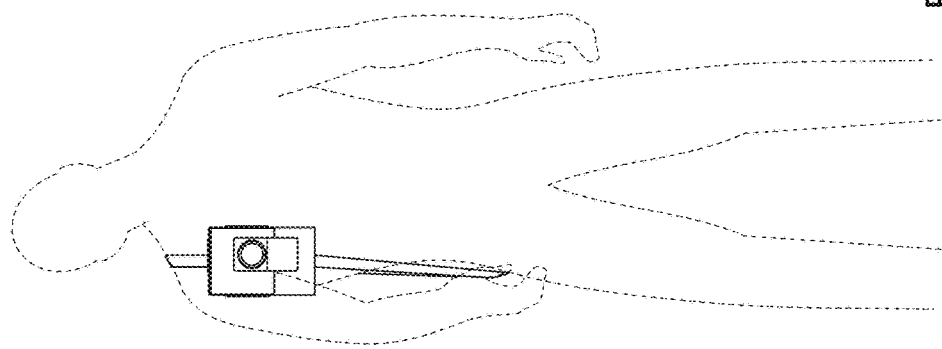

As a choice, sticky buckles (Velcro) can be set in some appropriate places of the cover pieces and the shell, used to flip the cover pieces fastening on the shell, convenient for the user to operate. Such as shown in FIG. 15, at an appropriate place on the surface of the fourth cover piece 13, set a male side (or a maternal side) a of a sticky buckle; and at corresponded place of the same side of the shell 1, set a maternal side (or a male side) a' of the sticky buckle to make the male side (or a maternal side) on the fourth cover piece 13 combine with the maternal side (or a male side) on the shell when it's turned down. As shown in FIG. 16, sticky buckles b, b' are provided on the surface of the second cover piece 110 for covering the lens and on the appreciate place of the front of the shell. Similarly, sticky buckles can also be equipped at the corresponded place of other cover pieces and the shell according to the needs, enable the cover, after opening the zipper flipping down, to combine with the shell on the corresponding position of the sticky buckle, and fasten on the shell. FIGS. 18 to 20 show state graphs of a few cover pieces and the shell jointed together through the sticky buckles or other detachable fastening ways, not detailed here.

For the convenience of use, set a strap on the camera bag. As shown in FIGS. 21 to 24, a strap 8 is equipped at the middle of the back of the camera bag. The camera bag can be shoulder and back, and can also be messenger. When using the camera, the user can adjust the camera bag below their head to the height which can find a view through the vertical viewfinder. The user can just use one hand to hold the strap to keep camera bag in the appropriate height, and shoot by using the shutter release through the above structure of the present invention, no need to take the camera out.

Figure 27:
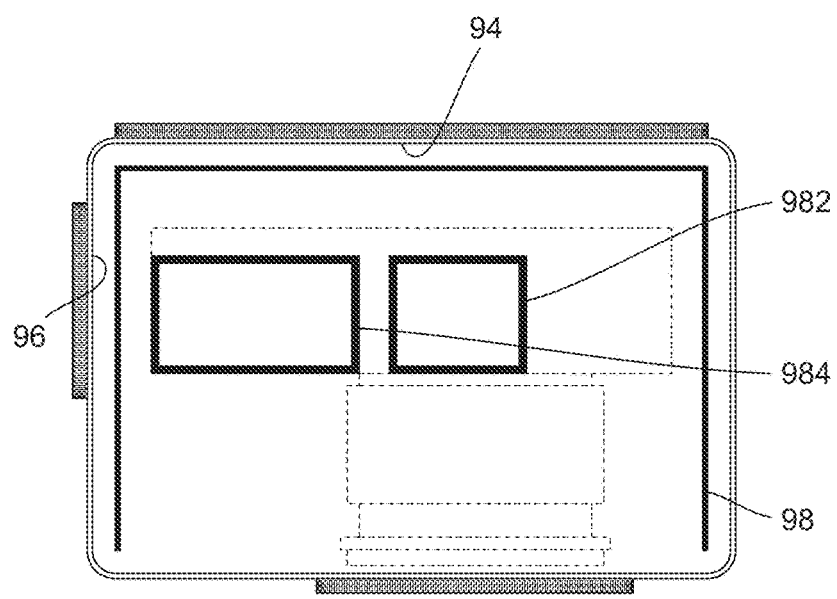
FIG. 27 is a top view of the camera bag as shown in FIG. 25.

FIGS. 25 to 27 show another embodiment of the present invention. In this embodiment, the camera bag comprises a shell device 9 used for placing and fastening a camera. The front part of the shell device has a lens aperture and a fixing means 92 used for fixing the lens. The structure of the fixing means is as same as the embodiment above, not detailed here. An opening 94 is provided on the rear part of the shell device, the location and size of this opening is roughly corresponded with lens screen. An opening 96 is provided at the right side wall corresponding to location of the shutter release plug interface. All of these openings above are closed by a cover piece. The bottom side of each cover piece is fixedly connected to the shell device. The closed way can be realized through zipper or buckle way, as shown in the figures is a zipper closed way.

The top of the shell device 9 is exposed end, can be closed through a cover piece 98. One side of the cover piece 96 is fixed near the front edge of the top of the shell device. Other sides are combined with the shell device through zipper, as shown in FIG. 27. Two openings 982 and 984 are provided on the cover piece 98, the location of the opening 982 is corresponded to the location of the vertical viewfinder, the location of the opening 984 is corresponded to the location of the button on the top right corner of the camera. Each opening can be closed by a cover piece with a zipper. The front side of each cover piece is fixedly connected to the shell device. As a choice, only one opening is provided on the cover piece 98 (not shown), the location and size of the opening is corresponded to the locations of the vertical viewfinder and the button on the top right corner of the camera. This opening is also closed by a cover piece with zipper.

The bottom of the shell device 9 is equipped with a hard supporting plate 93 for fixing the camera. At least one slot is provided on the supporting plate 93. One end of the slot is equipped with an entrance which allows a fastening screw to insert into.

Preferably, two parallel slots can be provided on the supporting plate. The purpose is: when using a lens with different length, the camera can be mounted on the proper slot by a fastening screw, enable the front of the lens accurately fix on the front wall of the camera bag.

As a choice, in the embodiment shown in the FIGS. 25 to 27, the supporting plate 93 which is used for fixing the camera can be molded as one with the shell device, and it can also be equipped on the inner surface of the bottom of the shell device 9 as an isolated part. If the supporting plate 93 and the shell device 9 are molded as one, the materials of the supporting plate on the bottom of the shell device should be as hard as possible. That will firmly support the camera without deformation. If the supporting plate is equipped on the inner surface of the bottom of the shell device as an isolated part, the bottom of the shell device is also provided with slot(s) corresponded to the slot(s) on the supporting plate. That allows a fastening screw to insert in the slot of the supporting plate from the bottom of the shell device, and then to fix the camera, not shown. In the later case, a foot pad with a certain height can be equipped on each corner on the external surface of the bottom of the shell device (not shown), prevent the fastening screw, which is used for fixing the camera on the bottom of the camera bag, affecting the balancing of the camera bag due to it exposed outside.

The structure of the slot(s) is almost the same as the embodiment above, so it is not shown in the figures.

In this embodiment, there is one strap 10, both ends of the strap are fixed on the both sides of the camera bag. User can side back or slung over the camera bag.

In every embodiment above, each window, opening and its cover piece can use any other proper ways, except the zipper, to joint. Such as, but not limited to: snap fastener, button, etc. The shell or shell device of the camera bag can be made from fabric, leather or any other proper materials. The appearance of the camera bag can be designed to a common shape of the shoulder bag or messenger bag.

It should be noted that those of ordinary skill in the art, in the present invention without departing from the concept of the premise, but also can be made several variations and modifications which fall within the protection scope of the present invention. Therefore, the scope of the present invention patent protection should be subject to the appended claims.

What is claimed is:

1. A camera bag, comprises a supporting frame for fixing a camera, a shell for accommodating the camera and the supporting frame, the supporting frame comprises a front panel having a lens aperture and a supporting plate used for fixing the camera, the front panel is detachably connected to the supporting plate through a connector, the front panel can rotate relative to the supporting plate; the camera bag also comprises a fixing means for fixing front of the camera lens on the front panel of the supporting frame, a first window with a cover piece is provided on front of the shell, the first window is corresponded with the lens aperture of the front panel of the supporting frame, a second window with a cover piece is provided on back of the shell for watching a camera LCD screen, a third window with a cover piece is provided on top of the shell for watching a vertical viewfinder of the camera and operating a button on top right corner of the camera; wherein a fourth window with a cover piece is provided at a first position on the shell corresponding to a camera shutter release plug interface.

2. The camera bag according to claim 1, wherein at least one slot is provided on the supporting plate for fixing the camera, one end of the slot is arranged as an entrance which allows a fastening screw to insert in.

3. The camera bag according to claim 2, wherein there are two slots on the supporting plate for fixing the camera.

4. The camera bag according to claim 1, wherein the fixing means for fixing the front of the camera lens comprises a first component, a second component and a third component each of which is shaped as a circular ring, wherein the first component and the second component are mounted on outside and inside of the lens aperture of the front panel of the supporting frame to make the fixing means fixed on the supporting frame, one end of the third component is connected to the second component by ways of a snap connection, while other end is connected to the front of the camera lens by ways of a threaded connection.

5. The camera bag according to claim 4, wherein outside of the first component is connected with a UV filter by ways of a threaded connection.

6. The camera bag according to claim 1, wherein a fifth window with a cover piece is provided at a second position on the shell corresponding to other side of the camera shutter release plug interface and allowing a user to stick fingers into the fifth window for operating a zoom ring of the camera lens.

7. The camera bag according to claim 1, wherein the front plate of the supporting frame is set as a retractable lens fixing frame which comprises a retractable frame, the retractable frame is constructed by a frame, a panel for fixing the camera lens and a connecting means, the connecting means connects the frame to the panel and made by a collapsible material.

8. The camera bag according to claim 1, wherein a cavity is provided under the supporting plate of the supporting frame, a sixth window with a cover piece is provided on back of the camera bag corresponding to the cavity.

* * * * *